US010017881B2

(12) United States Patent
Shinmen et al.

(10) Patent No.: US 10,017,881 B2
(45) Date of Patent: Jul. 10, 2018

(54) POLYACRYLONITRILE-BASED COPOLYMER, POLYACRYLONITRILE-BASED PRECURSOR FIBER FOR CARBON FIBER, CARBON FIBER BUNDLES, PROCESS FOR PRODUCING STABILIZED FIBER BUNDLES, AND PROCESS FOR PRODUCING CARBON FIBER BUNDLES

(75) Inventors: Yusuke Shinmen, Hiroshima (JP); Norifumi Hirota, Hiroshima (JP); Naoki Aoyama, Hiroshima (JP); Naomasa Matsuyama, Hiroshima (JP); Takeshi Nii, Hiroshima (JP); Yasuyuki Fujii, Hiroshima (JP); Yoshiko Irie, Hiroshima (JP); Harumi Matsuda, Hiroshima (JP)

(73) Assignee: MITSUBISHI CHEMICAL CORPORATION, Tokyo (JP)

( * ) Notice: Subject to any disclaimer, the term of this patent is extended or adjusted under 35 U.S.C. 154(b) by 1070 days.

(21) Appl. No.: 14/234,225

(22) PCT Filed: Jul. 20, 2012

(86) PCT No.: PCT/JP2012/068424
§ 371 (c)(1),
(2), (4) Date: Jan. 22, 2014

(87) PCT Pub. No.: WO2013/015210
PCT Pub. Date: Jan. 31, 2013

(65) Prior Publication Data
US 2014/0212663 A1   Jul. 31, 2014

(30) Foreign Application Priority Data

Jul. 22, 2011  (JP) ................... 2011-160802
Jan. 31, 2012  (JP) ................... 2012-018481

(51) Int. Cl.
| | |
|---|---|
| *D01F 9/22* | (2006.01) |
| *D01F 6/38* | (2006.01) |
| *C08F 220/48* | (2006.01) |
| *C08F 220/20* | (2006.01) |
| *C08F 220/56* | (2006.01) |
| *C08F 220/18* | (2006.01) |
| *C08F 220/06* | (2006.01) |

(52) U.S. Cl.
CPC ............ *D01F 9/22* (2013.01); *C08F 220/48* (2013.01); *D01F 6/38* (2013.01); *D01F 9/225* (2013.01); *C08F 220/06* (2013.01); *C08F 220/18* (2013.01); *C08F 220/20* (2013.01); *C08F 220/56* (2013.01); *Y10T 428/2918* (2015.01)

(58) Field of Classification Search
CPC ........ C08F 20/42; C08F 20/58; C08F 220/44; C08F 220/40; D01F 6/38; D01F 9/22; D01F 9/225; Y10T 428/2918; Y10T 428/2967; C08L 33/20; C08L 33/08; C08L 33/04; C08L 9/02
See application file for complete search history.

(56) References Cited

U.S. PATENT DOCUMENTS

| | | | |
|---|---|---|---|
| 3,718,716 A * | 2/1973 | Joh ................... | C08F 20/42 260/DIG. 21 |
| 4,362,646 A * | 12/1982 | Ikegami ............... | C01B 32/382 264/29.2 |
| 5,217,701 A | 6/1993 | Sakata et al. | |
| 6,428,891 B1 | 8/2002 | Okuya et al. | |

(Continued)

FOREIGN PATENT DOCUMENTS

| | | |
|---|---|---|
| CN | 1316027 A | 10/2001 |
| CN | 101824670 A | 9/2010 |
| JP | 47-9741 | 3/1972 |

(Continued)

OTHER PUBLICATIONS

Combined Chinese Office Action and Search Report dated Mar. 24, 2015 in Patent Application No. 201280036083.9 (with English Translation of Category of Cited Documents).
Extended European Search Report dated Nov. 14, 2014 in Patent Application No. 12817711.0.
International Search Report dated Oct. 9, 2012, in PCT/JP2012/068424, filed Jul. 20, 2012.

*Primary Examiner* — Jennifer A Steele
(74) *Attorney, Agent, or Firm* — Oblon, McClelland, Maier & Neustadt, L.L.P.

(57) ABSTRACT

Provided are: a polyacrylonitrile-based precursor fiber for the production of a carbon fiber having a large single-fiber fineness, said precursor fiber ensuring high heat stability of a spinning dope and excellent productivity; and a copolymer suitable for the production of said precursor fiber. Also provided are: high-quality carbon fiber bundles which have a large single-fiber fineness and excellent productivity; a process for producing the same; and a process for producing flameproofed fiber bundles suitable for the production of the carbon fiber bundles. A polyacrylonitrile-based copolymer which comprises 93.0 to 99.4 mol % of acrylonitrile units, 0.5 to 4.0 mol % of (meth)acrylamide-based units, and 0.1 to 3.0 mol % of unsaturated carboxylic acid hydroxyalkyl ester units and in which the (meth)acrylamide-based units are (meth)acrylamide units and/or (meth)acrylamide derivative units having a molecular weight of 105 or less; a precursor fiber comprising the copolymer; a process for producing flameproofed fiber bundles which uses precursor fiber bundles consisting of the precursor fiber; carbon fiber bundles; and a process for production thereof.

9 Claims, No Drawings

(56) References Cited

U.S. PATENT DOCUMENTS

2011/0130503 A1* 6/2011 Hirota ........................ C08F 4/40
524/228

FOREIGN PATENT DOCUMENTS

| | | |
|---|---|---|
| JP | 47-10251 | 3/1972 |
| JP | 47-33019 | 8/1972 |
| JP | 1-132832 | 5/1989 |
| JP | 2-6625 | 1/1990 |
| JP | 2-84505 | 3/1990 |
| JP | 11-124743 | 5/1999 |
| JP | 2004-183194 | 7/2004 |
| JP | 2005-133274 | 5/2005 |
| JP | 2006-257580 | 9/2006 |
| JP | 2007-204880 | 8/2007 |
| JP | 2008-202207 | 9/2008 |
| JP | 2011-046942 A | 3/2011 |

* cited by examiner

POLYACRYLONITRILE-BASED COPOLYMER, POLYACRYLONITRILE-BASED PRECURSOR FIBER FOR CARBON FIBER, CARBON FIBER BUNDLES, PROCESS FOR PRODUCING STABILIZED FIBER BUNDLES, AND PROCESS FOR PRODUCING CARBON FIBER BUNDLES

TECHNICAL FIELD

The present invention relates to a polyacrylonitrile-based copolymer, a polyacrylonitrile-based precursor fiber for carbon fiber, a carbon fiber bundle, a method for producing a stabilized fiber bundle, and a method for producing carbon fiber bundles.

BACKGROUND ART

When it is attempted to improve productivity by increasing the total fineness of fiber bundles for the purpose of reducing the production cost for carbon fibers, there occur many problems to be solved in view of practical use or in view of production technologies. Thus, there have been occasions in which cost reduction could not be achieved sufficiently.

In order to solve these problems, Patent Document 1 proposes a technology in which scorching at the time of a stabilization treatment is suppressed by using a carbon fiber precursor fiber bundle having a high degree of roundness and a large value of single fiber fineness, and a carbon fiber bundle containing few interlaced single fibers and having excellent spreadability and excellent productivity in spite of its large total fineness, is obtained.

Furthermore, Patent Document 2 suggests a polymer which does not require a stabilizing process. Also, Patent Documents 3 and 4 propose a technology for enhancing oxygen permeability of a carbon fiber precursor fiber to thereby control the oxygen concentration distribution to be uniform within a stabilized fiber, and enhancing the tensile strength and tensile modulus of a carbon fiber thus obtained, by using a monomer having a bulky side chain as a copolymerized component of a copolymer.

Furthermore, Patent Document 5 proposes a technology for subjecting a polyacrylonitrile (PAN)-based carbon fiber precursor fiber to stabilizing while allowing heated air to penetrate into a yarn bundle on a mesh-shaped roller, and thereby suppressing heat accumulation inside the yarn bundle.

On the other hand, in view of the reduction of the production cost for carbon fibers, process stabilization is also a critical technology. For example, gelling of a spinning dope in a spinning process directly leads to process trouble, and there is a demand for an increase in thermal stability. Patent Document 6 discloses that a dramatic enhancement in thermal stability is achieved when a spinning dope is maintained at a high temperature of about 80° C., by esterifying methacrylic acid which is a component for accelerating a stabilizing reaction of a polymer.

CITATION LIST

Patent Document 1: Japanese Patent Application Laid-Open (JP-A) No. 2008-202207
Patent Document 2: JP-A No. 1-132832
Patent Document 3: JP-A No. 2-84505
Patent Document 4: JP-A No. 2006-257580
Patent Document 5: JP-A No. 2-6625
Patent Document 6: JP-A No. 2007-204880

DISCLOSURE OF INVENTION

Problem to be Solved by the Invention

The inventions described in the various patent documents described above have room for improvements with regard to the following points.

In the technology of Patent Document 1, the stabilizing process itself is shortened, but since a process for stabilizing a polymer is required, the carbon fiber production process as a whole is not shortened, and further improvement is required.

The strength of the carbon fiber of Patent Document 2 may be significantly lower compared with that of carbon fibers produced using PAN or pitch as raw materials, and therefore, the demand of the market may not be satisfied.

In the technologies of Patent Documents 3 and 4, permeability of oxygen into the fiber interior is improved, but a further improvement is required for the cost reduction by shortening of the stabilizing process. Furthermore, in the case of the methacrylic acid ester-based monomer having a bulky alkyl group used in the copolymer, the precursor fiber bundle may not maintain sufficient compactness or homogeneity for securing the performance exhibiting properties of the carbon fiber.

In the technology of Patent Document 5, when the yarn bundle becomes thick, it is difficult to allow heated air to penetrate therethrough. Also, when the ejection pressure of the heated air is increased, interlacing may occur within the yarn bundle. Thus, there are occasions in which spreadability at the time of making a prepreg may decrease.

In the technology of Patent Document 6, thermal stability of the spinning dope increases dramatically, but there are occasions in which when a precursor fiber bundle having a large value of single fiber fineness is stabilized in a treatment time that does not impair productivity, a dual cross-section structure may be formed.

An object of the present invention is to provide a polyacrylonitrile-based precursor fiber for a carbon fiber having a large value of single fiber fineness, the precursor fiber having high thermal stability of the spinning dope and excellent productivity; and a polyacrylonitrile-based copolymer appropriate for the production of this precursor fiber. Another object of the present invention is to provide a high quality carbon fiber bundle having a large value of single fiber fineness and excellent productivity, a method for producing the carbon fiber bundle, and a method for producing a stabilized fiber bundle appropriate for the production of this carbon fiber bundle.

Means for Solving Problem

Thus, the inventors of the present invention conducted a thorough investigation and solved the problems described above, thus finally attaining the present invention.

A first polyacrylonitrile-based copolymer of the present invention is composed of an acrylonitrile unit in an amount of from 93.0 mol % to 99.4 mol %, a (meth)acrylamide-based unit in an amount of from 0.5 mol % to 4.0 mol %, and a hydroxyalkyl unsaturated carboxylate unit in an amount of from 0.1 mol % to 3.0 mol %, the (meth)acrylamide-based unit being any one or both of a (meth)acrylamide unit and a (meth)acrylamide derivative unit having a molecular weight of 105 or less.

A second polyacrylonitrile-based copolymer of the present invention is composed of an acrylonitrile unit in an amount of 93.0 mol % to 98.7 mol %, a (meth)acrylamide-based unit in an amount of from 1.0 mol % to 4.0 mol %, and a hydroxyalkyl unsaturated carboxylate unit in an amount of from 0.3 mol % to 3.0 mol %, the (meth)acrylamide-based unit being any one or both of a (meth)acrylamide unit and a (meth)acrylamide derivative unit having a molecular weight of 105 or less.

The hydroxyalkyl unsaturated carboxylate unit is preferably any one or both of a hydroxyalkyl methacrylate unit and a hydroxyalkyl acrylate unit.

The polyacrylonitrile-based precursor fiber for carbon fiber of the present invention is characterized by being composed of the first or second polyacrylonitrile-based copolymer. Furthermore, the polyacrylonitrile-based precursor fiber for carbon fiber of the present invention preferably has a single fiber fineness of from 1.5 dtex to 3.0 dtex.

The method for producing a stabilized fiber bundle of the present invention includes heating a precursor fiber bundle composed of the polyacrylonitrile-based precursor fiber for carbon fiber in an oxidizing atmosphere at a temperature of from 220° C. to 300° C. for a time of 90 minutes or less, and thereby obtaining a stabilized fiber bundle having a fiber density of from 1.35 g/cm$^3$ to 1.43 g/cm$^3$.

The method for producing a carbon fiber bundle of the present invention includes heating the stabilized fiber bundle obtained by the method for producing a stabilized fiber bundle, in an inert gas at a temperature of from 800° C. to 2000° C., and thereby obtaining a carbon fiber bundle.

The carbon fiber bundle of the present invention is obtained by firing a precursor fiber bundle composed of the polyacrylonitrile-based precursor fiber for carbon fiber, and the maximum diameter of the single fiber is from 8 μm to 20 μm. However, the maximum diameter of the single fiber means the maximum value in a distance between two points along the outer circumference of a cross-section obtainable when a cross-section perpendicular to the fiber axis of the single fiber is observed by scanning electron microscopy (SEM).

Effect of the Invention

According to the present invention, there are provided a polyacrylonitrile-based precursor fiber for a carbon fiber having a large value of single fiber fineness, the precursor fiber having high thermal stability of the spinning dope and excellent productivity; and a polyacrylonitrile-based copolymer appropriate for the production of this precursor fiber. Furthermore, according to the present invention, there are provided a high quality carbon fiber bundle having a large value of single fiber fineness and excellent productivity, a method for producing the carbon fiber bundle, and a method for producing a stabilized fiber bundle appropriate for the production of this carbon fiber bundle.

EMBODIMENTS OF THE INVENTION

[Polyacrylonitrile-Based Copolymer]

The content of the acrylonitrile unit in the polyacrylonitrile-based copolymer (hereinafter, may be simply referred to as a copolymer) of the present invention is from 93.0 mol % to 99.4 mol %. When the content is 93.0 mol % or more, the polyacrylonitrile-based copolymer is not affected by a decrease in the carbon fiber performance caused by a decrease in the copolymerization ratio of the acrylonitrile unit. On the other hand, the upper limit 99.4 mol % is defined from the required amounts of the copolymerized components that will be described below ((meth)acrylamide, (meth)acrylamide derivative having a molecular weight of 105 or less, and a hydroxyalkyl unsaturated carboxylate). Meanwhile, the upper limit of the content of the acrylonitrile unit in the copolymer is preferably 98.7 mol % or less, and the lower limit is preferably 95.0 mol % or more from the viewpoint of maintaining the performance of the resulting carbon fiber.

The content of the (meth)acrylamide-based unit in the copolymer is from 0.5 mol % to 4.0 mol % in total. Meanwhile, the (meth)acrylamide means any one or both of methacrylamide and acrylamide. Furthermore, the (meth)acrylamide-based unit means any one or both of a (meth)acrylamide unit and a (meth)acrylamide derivative unit having a molecular weight of 105 or less. In addition, this molecular weight means the molecular weight of the (meth)acrylamide derivative that forms the (meth)acrylamide derivative unit.

This (meth)acrylamide-based unit is highly likely to undergo random copolymerization with acrylonitrile, and it is speculated that a cyclic structure is formed in a form very similar to acrylonitrile by a heat treatment. Particularly, thermal decomposition in an oxidizing atmosphere that will be described below occurs to a very small extent. Furthermore, since the molecular weight of the (meth)acrylamide-based unit used in the present invention can be made smaller compared with the hydroxyalkyl unsaturated carboxylate unit that will be described below, even if the (meth)acrylamide-based unit is incorporated in a large amount, the influence on the molar content of the acrylonitrile unit in the copolymer is small, and solubility in solvents can be enhanced while a decrease in the carbon fiber performance is suppressed.

Furthermore, since the amide group carried by the (meth)acrylamide-based unit is hydrophilic, in the process of spinning a polyacrylonitrile-based copolymer (spinning process), the rate of diffusion of water into the interior of the fiber at the time of coagulation is made mild, and a compact or homogeneous carbon fiber precursor fiber bundle (hereinafter, also referred to as precursor fiber bundle) can be obtained.

When the percentage content of the (meth)acrylamide-based unit in the copolymer is 4.0 mol % or less, as described above, a decrease in the carbon fiber performance can be easily suppressed. Furthermore, when the percentage content of the (meth)acrylamide-based unit in the copolymer is 0.5 mol % or more, the percentage content of the acrylonitrile unit does not increase too high, and a decrease in solubility in a solvent at the time of obtaining a spinning dope, or a decrease in compactness of the precursor bundle required for the maintenance of the performance of the carbon fiber bundle thus obtainable can be easily suppressed. The percentage content of the (meth)acrylamide-based unit in the copolymer is preferably 1.0 mol % or more from the viewpoint of maintaining solubility or hydrophilicity of the copolymer, and from the viewpoint of maintaining the percentage content of the acrylonitrile unit of the copolymer, the percentage content is preferably 2.0 mol % or less.

The (meth)acrylamide derivative having a molecular weight of 105 or less may be any derivative having a (meth)acrylamide structure in the molecular structure, and examples include N-methylacrylamide, N-methylmethacrylamide, N,N-dimethylacrylamide, and N-(hydroxymethyl)acrylamide.

Meanwhile, the molecular weight of the (meth)acrylamide derivative is preferably smaller than the molecular weight of the hydroxyalkyl unsaturated carboxylate used in the copolymer, and is adjusted to 105 or less from the viewpoint of the carbon fiber performance.

Furthermore, these monomers ((meth)acrylamide derivative) may be used singly, or plural compounds may be used in combination. Furthermore, (meth)acrylamide and the (meth)acrylamide derivative may also be used in combination. Furthermore, in the case of using these in combination, the mixing ratio thereof can be freely set as long as the total amount of the (meth)acrylamide-based unit in the copolymer is from 0.5 mol % to 4.0 mol %.

Among these, since acrylamide has a small molecular weight, even if acrylamide is introduced in a large amount into the copolymer, from the viewpoint that the mass ratio of acrylonitrile in the copolymer can be maintained high, and acrylamide is industrially easily available, acrylamide is suitable as a constituent component of the copolymer of the present invention.

The content of the hydroxyalkyl unsaturated carboxylate unit in the copolymer is from 0.1 mol % to 3.0 mol % in total. Examples of the hydroxyalkyl unsaturated carboxylate include a hydroxyalkyl methacrylate, a hydroxyalkyl acrylate, a hydroxyalkyl 3-butenate, a hydroxyalkyl 2-methyl-3-butenate, a hydroxyalkyl 4-pentenate, and a hydroxyalkyl 2-methyl-4-pentenate. These may be used singly, or two or more kinds may be used in combination.

However, from the viewpoints of easy industrial availability, handleability, and easy copolymerizability with acrylonitrile, the hydroxyalkyl unsaturated carboxylate is preferably any one or both of a hydroxyalkyl methacrylate and a hydroxyalkyl acrylate.

The number of carbon atoms of the hydroxyalkyl group in the hydroxyalkyl unsaturated carboxylate is preferably 2 or greater from the viewpoint of securing oxygen diffusibility in the stabilizing process, and is preferably 5 or less from the viewpoint easy polymerizability with acrylonitrile or easy industrial availability. Furthermore, the alkyl in the hydroxyalkyl group may be linear or may be branched. Also, there may be one hydroxyl group, or two or more hydroxyl groups in the hydroxyalkyl unsaturated carboxylate.

The hydroxyalkyl carboxylate group in the hydroxyalkyl unsaturated carboxylate is such that the carboxylic acid ester moiety is thermally decomposed at a high temperature of 240° C. or higher and becomes a carboxylic acid group. When the content of the hydroxyalkyl unsaturated carboxylate unit in the copolymer is 0.1 mol % or more, there is obtained a sufficient effect that when the hydroxyalkyl carboxylate group in the hydroxyalkyl unsaturated carboxylate unit becomes a carboxylic acid group in the stabilizing process, the stabilizing reaction is accelerated. On the other hand, when the content is 3.0 mol % or less, run-away of the stabilizing reaction can be suppressed. Furthermore, a decrease in yield that is accompanied by thermal decomposition of the hydroxyalkyl group in the stabilizing process can be suppressed.

The lower limit of the content of the hydroxyalkyl unsaturated carboxylate unit in the copolymer is preferably 0.3 mol % or more, and more preferably 0.5 mol % or more, from the viewpoint of obtaining a higher performance carbon fiber bundle. Furthermore, the upper limit of the content of the hydroxyalkyl unsaturated carboxylate unit is preferably 2.0 mol % or less, and more preferably 1.5 mol % or less, from the viewpoint of suppressing a decrease in yield caused by thermal decomposition of the hydroxyalkyl group in the stabilizing process.

On the other hand, when an unsaturated carboxylic acid ester unit that does not contain a hydroxyl group is used instead of the hydroxyalkyl unsaturated carboxylate unit, the effect that a stabilizing reaction of the hydroxyalkyl unsaturated carboxylate proceeds mildly at a temperature of 240° C. or higher cannot be obtained, and therefore, it is difficult to perform a stabilization treatment uniformly.

Furthermore, the hydroxyalkyl carboxylate group in the hydroxyalkyl unsaturated carboxylate is a relatively bulky functional group, and has an effect of improving oxygen permeability in the precursor fiber bundle in the stabilizing process. Thereby, oxygen is sufficiently diffused down to the interior of single fibers even while the progress of the stabilizing reaction is suppressed. Therefore, even if a precursor fiber bundle having a large value of single fiber fineness is stabilized from a high temperature in a short time, a stabilized fiber bundle having a uniform degree of progress of stabilizing, in which the formation of a double cross-section structure is suppressed, can be obtained.

Furthermore, since the hydroxyalkyl carboxylate group in the hydroxyalkyl unsaturated carboxylate is a hydrophilic group, in the process of spinning a polyacrylonitrile-based copolymer (spinning process), the rate of diffusion of water into the interior of the fiber at the time of coagulation is made mild, and a compact or homogeneous precursor fiber can be obtained.

As described above, in the present invention, it is preferable to use any one or both of a hydroxyalkyl methacrylate and a hydroxyalkyl acrylate as the hydroxyalkyl unsaturated carboxylate. Examples of the hydroxyalkyl methacrylate include 2-hydroxyethyl methacrylate, 2-hydroxypropyl methacrylate, 4-hydroxybutyl methacrylate, and monoglyceryl methacrylate.

Furthermore, examples of hydroxyalkyl acrylate include 2-hydroxyethyl acrylate, 2-hydroxypropyl acrylate, 4-hydroxybutyl acrylate, and monoglyceryl acrylate.

As described above, in the present invention, a hydroxyalkyl methacrylate and a hydroxyalkyl acrylate may be used in combination. Meanwhile, in the case of using a hydroxyalkyl methacrylate and a hydroxyalkyl acrylate in combination, the mixing ratio can be freely selected as long as the content of the hydroxyalkyl unsaturated carboxylate unit in the copolymer is from 0.1 mol % to 3.0 mol % in total.

2-Hydroxyethyl methacrylate or 2-hydroxyethyl acrylate is suitable as a constituent component of the copolymer of the present invention, from the viewpoint that the release temperature of the hydroxyethyl group in the stabilizing temperature is 240° C. or higher, these compounds have sufficient bulkiness for an increase in oxygen permeability, the loss of mass is small when the hydroxyethyl group is detached, and the compounds are industrially easily available.

The molecular weight of the copolymer can be evaluated with the specific viscosity $\eta sp$ that is calculated by the following formula (1):

$$\eta sp = (\eta - \eta_0)/5\eta_0 \qquad \text{formula (1)}$$

$\eta$ represents the viscosity of a solution in which a copolymer is dissolved in a predetermined solvent, and $\eta_0$ is the viscosity of this solvent. The measurement of the viscosity of the solution can be carried out by, for example, dissolving 0.5 g of a copolymer in 100 ml of a solvent (for example, dimethylformamide), and analyzing the solution thus obtained at 25° C. using an Ubbelohde type viscometer.

The $\eta sp$ of the copolymer of the present invention is preferably from 0.20 to 0.26. When the specific viscosity is 0.20 or greater, a decrease in the performance of the resulting carbon fiber can be easily suppressed, and when the specific viscosity is 0.26 or less, the viscosity of the spinning dope thus obtainable is decreased, and gelling can be easily suppressed. More specifically, if the specific gravity is 0.26 or less, since solubility of the copolymer in a solvent at the time of preparing a spinning dope can be easily maintained at an appropriate level, when the spinning dope that will be described below gels at a low temperature of about 30° C., melt residues of the copolymer that serve as nuclei disappear, and gelling can be suppressed easily.

<Method for Producing Copolymer>

There are no particular limitations on the method for producing a copolymer, and known methods such as solution polymerization and suspension polymerization can be employed. Furthermore, there are no particular limitations on the polymerization initiator, and an azo-based compound, an organic peroxide, and a redox catalyst such as sulfuric acid/sulfurous acid or chloric acid/an ammonium salt of sulfurous acid can be used.

Regarding a suspension polymerization method, for example, various monomers, distilled water, ammonium persulfate, ammonium hydrogen sulfite and sulfuric acid are continuously supplied in certain amounts into an overflow type polymerization vessel, and while the system is maintained at a constant temperature, stirring is continued. Then, a polymer slurry thus overflowed is washed and dried, and thus a copolymer can be obtained.

Furthermore, a carbon fiber bundle can be produced from the copolymer of the present invention by a method for producing a carbon fiber bundle having the following processes:

(1) a process of dissolving a copolymer in a solvent and preparing a spinning dope;

(2) a process of spinning the spinning dope and obtaining a precursor fiber bundle;

(3) a process of heating the precursor fiber bundle in an oxidizing atmosphere at a temperature of from 220° C. to 300° C. for 90 minutes or less (stabilization treatment); and (4) a process of heating the stabilized fiber bundle obtained from the process 3, to a temperature of from 800° C. to 2000° C. in an inert gas (carbonization treatment).

Furthermore, a carbon fiber bundle can be obtained by calcining a precursor fiber bundle composed of precursor fibers formed from the copolymer of the present invention. Meanwhile, the term calcination as used herein can include a stabilizing process of heating a precursor fiber bundle in an oxidizing atmosphere (for example, air) at a temperature of from 220° C. to 300° C., and a carbonization process of heating the precursor fiber bundle in an inert atmosphere at a temperature of from 800° C. to 2000° C.

In the present invention, the stabilized fiber bundle obtained after the stabilization treatment (process 3) and before the carbonization treatment (process 4) can be subjected to a pre-carbonization treatment of heating in an inert gas at a temperature with the maximum temperature being lower than the carbonization treatment temperature (for example, higher than or equal to 550° C. and lower than 800° C.) (pre-carbonization process). Meanwhile, the calcination as described above can also be composed of the stabilizing process, the pre-carbonization process, and the carbonization process.

[Spinning Dope]

It is preferable that the spinning dope have a copolymer concentration at a certain level or higher, in order to obtain a compact coagulated yarn, and in order to have appropriate viscosity and fluidity. Specifically, the concentration of the copolymer in the spinning dope is preferably from 15% by mass to 30% by mass, and more preferably from 18% by mass to 25% by mass.

However, conventional spinning dopes (solutions in which conventional polyacrylonitrile-based copolymers are dissolved in organic or inorganic solvents) have their viscosities increased and are likely to undergo gelling mainly due to two factors.

A first factor involves a cyclization condensation reaction between nitrile groups in the polyacrylonitrile-based copolymer. This is the same reaction as the stabilizing reaction, and it is contemplated that since the reaction is accelerated by the carboxyl groups in the copolymer, when a spinning dope is maintained at a high temperature of about 80° C., gelling may occur more easily.

A second factor involves intermolecular association of carboxyl groups or hydroxyl groups in the polyacrylonitrile-based polymer. It is contemplated that since this can occur more easily as the molecular movement occurs to a smaller extent, this association can occur easily when the spinning dope is maintained at a low temperature of about 30° C., and if there is any melt residues of the copolymer present in the spinning dope, those melt residues become nuclei, so that gelling may occur more easily.

The existence of unmelted material, gel or the like in a spinning dope may lead to trouble in the spinning process, and may significantly affect the productivity of the precursor fiber. Therefore, it is important to obtain a spinning dope having excellent solubility with suppressed gelling.

In the spinning dope prepared from the copolymer of the present invention, since the carboxyl groups in the copolymer are esterified with hydroxyalkyl groups, a cyclization condensation reaction of nitrile groups can be suppressed. Therefore, even if the spinning dope is maintained at a high temperature of about 80° C., gelling can occur with extreme difficulties.

However, since a hydroxyalkyl unsaturated carboxylate containing hydroxyalkyl groups has a large molecular weight, when it is attempted to secure a molar composition that is desirable for maintaining solubility of the copolymer in a solvent at an appropriate level, the percentage content of the hydroxyalkyl unsaturated carboxylate in the copolymer tends to become very large. Accordingly, there is a risk that the percentage content of acrylonitrile in the copolymer may be decreased, and the yield of the carbon fiber that can be finally obtained may decrease.

Thus, when any one or both of (meth)acrylamide and a (meth)acrylamide derivative, both of which have a molecular weight almost equal to that of acrylonitrile (smaller molecular weight compared with a hydroxyalkyl unsaturated carboxylate), are hydrophilic similarly to a hydroxyalkyl unsaturated carboxylate, and are capable of securing compactness of a precursor fiber bundle, are used in copolymerization, a molar composition that can adequately maintain solubility of the copolymer in a solvent was secured. Thereby, a spinning dope using the copolymer of the present invention is not accompanied by intermolecular association between carboxyl groups or hydroxyl groups even if the spinning dope is maintained at a low temperature of about 30° C., and since melt residues of the copolymer that serve as nuclei do not exist, gelling can be suppressed.

Regarding the dope stability of the spinning dope, it is preferable that the spinning dope be stable (do not gel) for 50 days or longer when maintained at 80° C., and stable for 30 days or longer at 30° C. It may be contemplated that if the spinning dope is stable for 50 days or longer when maintained at 80° C., and stable for 30 days or longer at 30°

C., even if the spinning dope has been exposed to a vigorous temperature change during the production process for a carbon fiber precursor fiber bundle, the process is not affected by gelling of the spinning dope.

<Preparation of Spinning Dope (Step 1)>

The copolymer described above is dissolved in a solvent, and thus a spinning dope is obtained. Regarding the solvent, an organic solvent such as dimethylacetamide, dimethyl sulfoxide, or dimethylformamide; or an aqueous solution of an inorganic compound such as zinc chloride or sodium thiocyanate can be used. From the viewpoint that no metal is contained in the precursor fiber, and the process is simplified, an organic solvent is preferred, and among others, from the viewpoint that a coagulated yarn and a wet-heat stretched yarn acquire high compactness, it is preferable to use dimethylacetamide.

(Precursor Fiber Bundle)

The carbon fiber precursor fiber bundle used in the present invention is composed of a polyacrylonitrile-based precursor fiber for carbon fiber formed from the aforementioned copolymer.

<Single Fiber Fineness of Precursor Fiber Bundle>

The single fiber fineness of the precursor fiber bundle is preferably from 1.5 dtex to 3.0 dtex. When the single fiber fineness of the precursor fiber bundle is 1.5 dtex or greater, sufficient increase in productivity of the precursor fiber bundle can be easily achieved. On the other hand, when the single fiber fineness of the precursor fiber bundle is 3.0 dtex or less, significant formation of a double cross-section structure during the stabilizing process can be easily prevented, and carbon fiber bundles having a uniform quality can be stably produced. Furthermore, from the viewpoints of further increasing the productivity of the precursor fiber bundle and securing the quality of the carbon fiber bundle, the single fiber fineness is more preferably from 1.8 dtex to 2.8 dtex, and even more preferably from 2.0 dtex to 2.5 dtex.

<Cross-Sectional Shape of Precursor Fiber Bundle>

It is preferable that the cross-sectional shape of a single fiber of the precursor fiber bundle used in the present invention have a degree of roundness of 0.90 or less. Furthermore, the cross-sectional shape is preferably a broad bean shape. When the cross-sectional shape is a broad bean shape having a degree of roundness of 0.90 or less, insufficient diffusion of oxygen into the single fibers that constitute the precursor fiber bundle at the time of stabilization treatment can be easily prevented, and a sufficient stabilizing reaction can be easily carried out. As a result, fluffing during the carbonization process is easily suppressed, and satisfactory process passability can be easily obtained. Further, the strength or elastic modulus of the carbon fiber bundle thus obtainable can be easily maintained appropriately.

Furthermore, the degree of roundness in the cross-sectional shape of the single fiber that constitutes the precursor fiber bundle is preferably 0.75 or greater, and more preferably 0.80 or greater. When the degree of roundness is 0.75 or greater, a decrease in the fiber percentage content that occurs when a prepreg is produced from the resulting carbon fiber bundle as a result of the cross-sectional shape becoming very irregular, can be easily prevented. Thus, this fiber percentage content can be easily increased. Furthermore, a decrease in the mechanical characteristics of a composite material using this carbon fiber bundle can be easily prevented.

The cross-sectional shape of a single fiber of the precursor fiber bundle composed of the precursor fiber of the present invention is such that the distance from the interior to the surface of the fiber is shortened as compared with the conventional single fibers. For this reason, even if the value of the single fiber fineness is made relatively large, the precursor fiber bundle can be uniformly stabilized, and a high performance carbon fiber can be easily obtained.

The degree of roundness of the single fiber that constitutes the fiber bundle (for example, a precursor fiber bundle or a carbon fiber bundle) can be determined by the following formula (2). Meanwhile, S and L in the formula (2) represent the cross-sectional area and the circumferential length of the single fiber, respectively, which may be obtained by making a SEM observation of a cross-section perpendicular to the fiber axis of the single fiber, and making an image analysis.

$$\text{Degree of roundness} = 4\pi S/L^2 \qquad (2)$$

<Method for Producing Precursor Fiber Bundle (Step 2)>

The carbon fiber precursor fiber bundle used in the present invention can be produced by spinning the polyacrylonitrile-based copolymer described above by a known method. A spinning method will be described below.

Regarding the spinning method, any known method can be employed, and specific examples include a wet spinning method, a dry-wet spinning method, and a dry spinning method. Among these, a wet spinning method and a dry-wet spinning method are preferably used from the viewpoint of the spinning productivity, and from the viewpoint of the strength exhibition properties of the carbon fiber.

A coagulated yarn can be obtained by spinning and discharging the spinning dope into a coagulation bath through a spinneret. For the coagulation bath at this time, it is preferable to use an aqueous solution of dimethylacetamide having a dimethylacetamide concentration of from 30% by mass to 70% by mass at a temperature of from 20° C. to 50° C.

When the concentration is 30% by mass or more, the rate of coagulation can be easily maintained in an appropriate range, rapid shrinkage of a coagulated yarn can be prevented easily, and thus compactness of the yarn can be maintained easily. On the other hand, when the concentration is 70% by mass or less, since the rate of coagulation can be easily maintained in an appropriate range, adhesion in a short time of the precursor fiber bundle thus obtainable can be easily suppressed. Furthermore, when a precursor fiber bundle having a total fineness of 50,000 dtex or more is spun, from the viewpoint of further suppressing the adhesion between single yarns, the concentration is more preferably 65% by mass or less. Particularly, in the case of spinning a precursor fiber bundle having a single fiber fineness of 1.5 dtex or more, from the viewpoint of adjusting the degree of roundness in the cross-sectional shape of the single yarn to 0.90 or less, it is particularly preferable to adjust the concentration of the coagulation bath to 60% by mass or less.

Furthermore, when the temperature is 20° C. or higher, the coagulation tension can be easily maintained in an appropriate range, and the occurrence of single yarn breakage in the coagulation bath can be easily suppressed. Furthermore, the cooling operation of the coagulation bath can be simplified, and the capital investment or the running cost can be suppressed easily, so that precursor fiber bundles can be produced easily at low cost. On the other hand, when the temperature is adjusted to 50° C. or lower, a decrease in the strand strength of the carbon fiber bundle obtainable by calcining the precursor fiber bundle can be suppressed easily. The temperature of the aqueous solution of dimethylacetamide used in the coagulation bath is more preferably from 25° C. to 40° C., from the viewpoint of securing process stability in the coagulation process and increasing the strand strength of the carbon fiber bundle. Furthermore, in the case of spinning a precursor fiber bundle having a single fiber fineness of 1.5 dtex or more, from the viewpoint of adjusting the degree of roundness in the cross-sectional shape of the single fiber to 0.90 or less, it is particularly preferable to adjust the temperature of the coagulation bath to 35° C. or lower.

Meanwhile, in order to obtain a compact and homogeneous precursor fiber bundle, the nature of the coagulated yarn is very important, and it is preferable that the number of macrovoid in the length of 1 mm of the coagulated yarn be less than 1. Thereby, appropriate compactness or homogeneity can be easily imparted to the fiber structure of the precursor fiber bundle, and these microvoids can be easily prevented from serving as defect points at the time of calcination and thereby impairing the performance of the carbon fiber. Here, a macrovoid is a general name for voids having a dimension with a maximum diameter of 0.1 µm to several micrometers (µm) and having a spherical shape, a cone shape or a cylindrical shape.

A coagulated yarn produced from the copolymer of the present invention almost lacks such macrovoids, and may be obtained by sufficiently uniform coagulation. When many macrovoids exist, the coagulated yarn is devitrified to become cloudy. However, since macrovoids hardly exist in the coagulated yarn according to the present invention, the coagulated yarn is not devitrified and does not easily become cloudy.

The presence or absence of macrovoids can be easily determined by observing a coagulated yarn directly with an optical microscope, or by observing a cross-section of a coagulated yarn cut by an appropriate method, using an optical microscope.

Next, the coagulated yarn thus obtained can be subjected to wet heat stretching. The orientation of the fiber can be further increased thereby. The wet heat stretching is carried out, specifically, by stretching the coagulated yarn while subjecting the coagulated yarn to water washing, or by stretching the coagulated yarn in hot water. Simultaneous stretching and water washing is preferable from the viewpoint of simplification and efficiency increase of the spinning process, and stretching in hot water is preferable from the viewpoint of productivity. The stretch ratio for the wet heat stretching is preferably 2.5 times or more, and more preferably 3.0 times or more. When the stretch ratio is 2.5 times or more, a sufficient effect of increasing the orientation of the fiber can be easily obtained. There are no particular limitations on the upper limit of the stretch ratio, but from the viewpoint of stability of the spinning process, the stretch ratio is preferably 6.0 times or less.

Furthermore, the fiber bundle that has been treated by wet heat stretching can be subjected to an oiling treatment with a silicone-based oil preparation. Regarding the silicone-based oil preparation, for example, a general silicone-based oil preparation such as an aminosilicone-based oil preparation can be used. It is preferable to use a silicone-based oil preparation by preparing the oil preparation at a concentration of from 0.4% by mass to 1.5% by mass. When the concentration of the silicone-based oil preparation is 0.4% by mass or more, only a very small amount of the oil preparation attaching to fiber bundles can be prevented easily, and when the concentration is 1.5% by mass or less, a very large amount of the oil preparation attaching to fiber bundles can be prevented easily. A more preferred range of the concentration of the silicone-based oil preparation is from 0.8% by mass to 1.5% by mass.

Next, the fiber bundle that has been subjected to an oiling treatment with a silicone-based oil preparation is dried, and thus a dried fiber bundle (dry densified yarn) can be obtained. This dried fiber bundle can be further stretched to a stretch ratio of from 1.2 times to 4.0 times by steam stretching or dry heat stretching. Meanwhile, the stretch ratio is preferably 1.3 times or more, from the viewpoint of maintaining the performance of the carbon fiber bundle.

Next, for the fiber bundle that has been subjected to steam stretching or dry heat stretching, an adjustment of the moisture percentage can be carried out with a touch roll as necessary, and thereafter, if necessary, an interlacing treatment can be applied by spraying air by a known method. Thus, a carbon fiber precursor fiber bundle can be obtained as described above. Meanwhile, bundling properties can be easily imparted by subjecting the filaments of a carbon fiber precursor fiber bundle to interlacing by performing an interlacing treatment. Thus, a fiber bundle which maintains the form of a single column can be easily obtained. Furthermore, the calcination process passability can be easily enhanced by making the fiber bundle very difficult to scatter away.

The moisture percentage of the fiber bundle after conducting the adjustment of the moisture percentage and before applying the interlacing treatment is preferably 15% by mass or less, more preferably 10% by mass or less, and even more preferably from 3% by mass to 5% by mass. When the moisture percentage is 15% by mass or less, the single fibers having difficulties to undergo interlacing when interlacing is applied by spraying air to the fiber bundle, can be easily prevented.

The moisture percentage of a fiber bundle can be determined by the formula: moisture percentage (mass %)=(w−$w_0$)×100/$w_0$, based on the mass w of the fiber bundle in a wet state, and the mass $w_0$ obtainable after drying the fiber bundle in a wet state in a hot air dryer at 105° C. for 2 hours.

The degree of interlacing in the carbon fiber precursor fiber bundle that has been subjected to an interlacing treatment is preferably in the range of 5 to 20 strands/m, and more preferably in the range of 10 to 14 strands/m. When the degree of interlacing is 5 strands/m or more, an effect of sufficiently enhancing the calcination process passability can be easily obtained by making the fiber bundle very difficult to scatter away by applying interlacing. When the degree of interlacing is 20 strands/m or less, decreases in the resin impregnability and fiber spreadability of the resulting carbon fiber bundle can be easily prevented.

The degree of interlacing of a carbon fiber precursor fiber bundle is a parameter representing how many times one single fiber in the fiber bundle is interlaced with another adjacent single fiber in a length of 1 m. This degree of interlacing can be measured by a hook drop method.

[Stabilized Fiber Bundle]

<Stabilization Treatment (Step 3)>

The precursor fiber bundle thus obtained can be converted to a stabilized fiber bundle by heating the precursor fiber bundle at a temperature of from 220° C. to 300° C. for a time of 90 minutes or less in an oxidizing atmosphere, that is, by stabilization treating the precursor fiber bundle. Meanwhile, from the viewpoint of thermally decomposing hydroxyalkyl carboxylate groups, it is preferable to set the stabilization treatment temperature to a temperature of 240° C. or higher for at least once during this stabilization treatment. In the present invention, the oxidizing atmosphere may be any atmosphere containing an oxidizing substance such as nitrogen dioxide, sulfur dioxide, or oxygen, and for example, the oxidizing atmosphere may be an atmosphere of air. Meanwhile, the oxidizing substance means a substance which causes combustion of an object by providing oxygen, or a substance which is capable of promoting combustion of an object.

<Stabilization Treatment Temperature>

When the temperature of the stabilization treatment is 220° C. or higher, there is no run-away of the stabilizing reaction, and a stabilization treatment can be carried out efficiently. Furthermore, when the temperature is 300° C. or lower, a stabilization treatment can be facilitated without thermally decomposing the polyacrylonitrile skeleton of the precursor fiber. Furthermore, when the precursor fiber bundle is subjected to a stabilization treatment at a treatment temperature of from 220° C. to 300° C. and for a treatment time of 90 minutes or less, the fiber density of the stabilized fiber bundle thus obtainable can be increased to a range of from 1.35 g/cm$^3$ to 1.43 g/cm$^3$.

From the viewpoint of further shortening the stabilization treatment time, the treatment temperature is preferably 230° or higher, and more preferably 240° C. or higher. From the viewpoint of suppressing the run-away of the stabilizing reaction, the treatment temperature is preferably 280° C. or lower.

<Stabilization Treatment Time>

The stabilization treatment time is preferably from 10 minutes to 90 minutes. When the stabilization treatment time is 10 minutes or longer, sufficient diffusion of oxygen into the interior of the single fibers that constitute a precursor fiber bundle can be carried out easily. Furthermore, when the stabilization treatment time is 90 minutes or less, the stabilization treatment process causing impairment of productivity in the production process for the carbon fiber bundle can be prevented easily, and thus carbon fiber bundles can be produced efficiently. Also, from the viewpoint of increasing the performance and productivity of the carbon fiber bundle, the stabilization treatment time is more preferably from 30 minutes to 70 minutes.

<Density of Stabilization Fiber Bundle>

The density of the stabilized fiber bundle obtainable by a stabilization treatment is preferably from 1.35 g/cm$^3$ to 1.43 g/cm$^3$. When the density is 1.35 g/cm$^3$ or more, there is no decrease in the yield of carbon fiber bundles, and carbon fiber bundles can be produced easily. Generally, it is known that as the stabilized fiber density is higher, the yield of the carbon fiber bundle thus obtainable tends to increase, but the performance of the carbon fiber tends to decrease. Therefore, when the density of the stabilized fiber bundle is 1.43 g/cm$^3$ or less, while a decrease in the performance of the carbon fiber is easily suppressed, the yield of the resulting carbon fiber bundle can be easily enhanced. From the viewpoint of maintaining the performance and increasing the yield of the carbon fiber thus obtainable, the density of the stabilized fiber bundle is more preferably from 1.38 g/cm$^3$ to 1.41 g/cm$^3$. Meanwhile, the fiber density can be measured by a density gradient tube method based on JIS K7112.

In step 3 of stabilizing the precursor fiber bundle, the progress of the stabilizing reaction is suppressed until the hydroxyalkyl carboxylate group (carboxylic acid ester group) in the hydroxyalkyl unsaturated carboxylate unit is thermally decomposed to become a carboxylic acid group. After a sufficient time for oxygen to diffuse into the interior of single fibers is secured thereby, when thermal decomposition of the hydroxyalkyl carboxylate group of the hydroxyalkyl unsaturated carboxylate unit occurs at a high temperature of 240° C., and the hydroxyalkyl carboxylate group becomes a carboxylic acid group, the stabilization treatment can be carried out rapidly at a high temperature of 240° C.

or higher. Therefore, for example, a stabilization treatment of the precursor fiber bundle is initiated at a temperature of the fiber bundle of lower than 240° C. to secure the time for oxygen to diffuse into the interior of single fibers (for example, from 5 minutes to 20 minutes), and then the stabilization treatment can be carried out at a temperature of the fiber bundle of 240° C. or higher.

Furthermore, the hydroxyalkyl carboxylate group in the hydroxyalkyl unsaturated carboxylate unit is a relatively bulky functional group, and has an effect of improving oxygen permeability in the stabilizing process. Due to such an effect, oxygen is diffused efficiently to the interior of single fibers while the progress of the stabilizing reaction is suppressed. Therefore, even if a stabilization treatment of a precursor fiber bundle having a large value of the single fiber fineness is carried out in a short time at a high temperature, the formation of a double cross-section structure is suppressed, and a stabilized fiber bundle with a uniform degree of progress of stabilizing can be obtained.

[Carbon Fiber Bundle]

<Carbonization Treatment (Step 4)>

After the stabilization treatment, a carbon fiber bundle can be produced by heating the stabilized fiber bundle thus obtained at a temperature of from 800° C. to 2000° C. in an inert gas, that is, by subjecting the carbon fiber bundle to a carbonization treatment. When the steps 1 to 4 are carried out, a carbon fiber bundle having a maximum diameter of the single fiber of from 8 μm to 20 μm can be obtained.

Furthermore, a graphite fiber bundle can also be produced by treating this carbon fiber bundle at a high temperature of from about 2500° C. to 2800° C. in an inert gas. An inert gas means a chemically stable gas which does not undergo a reaction with other substances, and specific examples thereof include nitrogen, helium, and argon.

<Maximum Diameter of Single Fiber of Carbon Fiber Bundle>

The maximum diameter of a single fiber of a carbon fiber bundle is defined as the longest segment among the segments that connect any two points on the outer circumference of a cross-section that is perpendicular to the fiber axis of the single fiber when the cross-section is observed by scanning electron microscopy (SEM), that is, the maximum value among the distances between any two points on the outer circumference of the cross-section.

When a carbon fiber bundle is composed of thick single fibers having a maximum diameter of 8 μm or more, the flexural rigidity of each single fiber can be easily increased, entanglement between fibers by a disturbance at the time of the production process can be easily reduced, and the number of interlacing within a yarn bundle can be easily decreased.

Furthermore, the maximum diameter of the single fiber is more preferably 9 μm or more, and even more preferably 10 μm or more. Thereby, the contacting portions between the single fibers inside a yarn bundle can be further reduced, and the friction resistance between the single fibers can be easily decreased. Therefore, even in the case of having a large number of fibers of the carbon fiber bundle, very satisfactory spreadability is obtained, and excellent oxygen permeability is obtained.

Furthermore, from the viewpoint of not decreasing the strength of the carbon fiber, the maximum diameter of the single fiber is preferably 20 μm or less, more preferably 15 μM or less, and even more preferably 14 μm or less. Thereby, the increase in the probability of existence of defects that is proportional to the volume increase per unit length, which occurs when the maximum diameter of the single fiber of the carbon fiber bundle is large, can be easily suppressed to an appropriate range, and a decrease in the strength of the carbon fiber can be easily prevented.

From the above-described points, the maximum diameter of the single fiber of the carbon fiber bundle is preferably from 8 μm to 20 μm, and particularly preferably from 10 μm to 15 μm.

<Cross-Sectional Shape of Single Fiber of Carbon Fiber Bundle>

The cross-sectional shape of the single fiber of the carbon fiber bundle obtainable by the production method of the present invention can be represented by the degree of roundness of a cross-section that is perpendicular to the fiber axis of the single fiber of the carbon fiber bundle. The degree of roundness can be determined using formula (2), similarly to the degree of roundness of the precursor fiber bundle.

The degree of roundness for the cross-sectional shape of the single fiber of the carbon fiber bundle is preferably 0.90 or less. Furthermore, it is preferable that the cross-sectional shape be a broad bean shape. When the cross-sectional shape is made into a broad bean shape having a degree of roundness of 0.90 or less, which is a relatively simple shape, compact packing the single fibers can be easily achieved, and therefore, the fiber percentage content in a prepreg can be easily increased, while the mechanical characteristics of a composite material can be easily enhanced. The degree of roundness of the single fiber that constitutes the carbon fiber bundle is more preferably 0.88 or less, and most preferably 0.86 or less, so that the distance from the surface of a single fiber to the center is shortened. Furthermore, the degree of roundness of the single fiber that constitutes the carbon fiber bundle is preferably 0.75 or greater, and more preferably 0.80 or greater. When the degree of roundness is 0.75 or greater, a decrease in the fiber percentage content that occurs when a prepreg is produced from the resulting carbon fiber bundle as a result of the cross-sectional shape becoming very irregular, can be easily prevented. Thus, this fiber percentage content can be easily increased. Furthermore, a decrease in the mechanical characteristics of a composite material using this carbon fiber bundle can be easily prevented.

On the other hand, as disclosed in JP-A No. 11-124743, a carbon fiber bundle having a cross-section with a relatively simple irregular shape such as a flat shape or a trilobed shape is such that as compared with a carbon fiber bundle having a degree of roundness of from 0.75 to 0.90, the single fibers are engaged with each other, and spreadability decreases. Furthermore, in regard to a single fiber having a cross-section with a complicated irregular shape such as an octalobed shape or a C-shape, the single fibers are less engaged with each other, but when compared with a carbon fiber having a degree of roundness of from 0.75 to 0.90, it is difficult to pack the single fibers compactly, so that the fiber percentage content cannot be increased when a prepreg is produced, and the mechanical characteristics of the composite material are deteriorated.

It is preferable that the carbon fiber bundle obtainable by the present invention have a strand tensile strength of 3000 MPa or greater and a strand elastic modulus of 230 GPa or greater. When the strand tensile strength is 3000 MPa or greater and the elastic modulus is 230 GPa or greater, the carbon fiber bundle can be readily applied in most of the fields in which carbon fibers are currently used, such as structural materials. Furthermore, from the same viewpoint, it is more preferable that the strand tensile strength be 3500 MPa or greater, and the strand elastic modulus be 240 GPa or greater. It is particularly preferable that the strand tensile strength be 4000 MPa or greater, and the strand elastic modulus be 245 GPa or greater.

The carbon fiber bundle obtainable by the present invention is preferably composed of 12000 or more single fibers of the carbon fiber having the above-described characteristics, converged into a bundle. As such, since the single fibers are thicker, and the number of single fibers is also larger, productivity at the time of production is improved to a large extent, and production at low cost can be facilitated. The number of carbon fibers that constituted the carbon fiber bundle is more preferably 24000 or more, and even more preferably 36000 or more.

Furthermore, from the viewpoint of preventing a decrease in productivity at the time of prepreg production, which is caused by shortening of the yarn length per carbon fiber package as a result of an increase in the total fineness of the carbon fiber bundle, the number of single fibers (number of filaments) that constitute the carbon fiber bundle is preferably 100,000 or less, more preferably 80,000 or less, and even more preferably 60,000 or less.

Meanwhile, since the number of the single fibers that constitute a fiber bundle does not change throughout the various processes, it is preferable that the precursor fiber bundle and the stabilized fiber bundle be also configured in the range of number mentioned above.

EXAMPLES

Hereinafter, the present invention will be described specifically by way of Examples. The various measurement methods and evaluation methods used in the Examples are as follows.

<1. Composition of Polyacrylonitrile-Based Copolymer>

The composition of a copolymer (ratio (mol %) of various monomer units) was measured in the following manner by a $^1$H-NMR method. Dimethyl sulfoxide d6 solvent was used as a solvent to dissolve the copolymer, and measurement was made using an NMR analyzer (manufactured by JEOL Ltd.; trade name: GSZ-400 type) under the conditions of a number of integrations of 40 times and a measurement temperature of 120° C. The ratio of various monomer units was determined from the integral ratio of chemical shifts.

<2. Specific Viscosity of Polyacrylonitrile-Based Copolymer>

0.5 g of a copolymer was dispersed in 100 ml of dimethylformamide, and the dispersion was maintained at 75° C. for 40 minutes. Thus, a copolymer solution was obtained. The specific viscosity was calculated from the viscosity η of this solution and the viscosity $\eta_0$ of the solvent (dimethylformamide). The viscosity measurements were all carried out at 25° C. with an Ubbelohde viscometer.

$$\eta sp = (\eta - \eta_0)/5\eta_0$$

<3. Evaluation of Dope Stability>

A copolymer solution obtained by dispersing 42 g of a copolymer in 158 g of dimethylformamide and maintaining the dispersion at 110° C. for 5 minutes, was introduced into two 200-mL viscometer tubes, and one of the viscometer tubes was maintained at 30° C., while the other viscometer tube was maintained at 80° C. in constant temperature baths. After that, at every predetermined period of time, a steel ball (product No. SB-1/4TN: manufactured by NTN Corporation) was dropped in each of the copolymer solutions, the change over time of the dropped ball viscosity was measured, and the number of days required for gelling was measured. Meanwhile, at this time, in the case of the dope maintained at 30° C. (copolymer solution), when the dropped ball viscosity exceeded 300 Pa·s (3000 P), it was considered that the copolymer solution had gelled. In the case of the dope maintained at 80° C., when the dropped ball viscosity exceeded 30 Pa·s (300 P), it was considered that the copolymer solution had gelled. The respective evaluation criteria will be described below.

Evaluation of maintenance at 30° C.

Stable: A sample for which the number of days taken until gelling occurred is 30 days or longer.

Unstable: A sample for which the number of days taken until gelling occurred is less than 30 days.

Evaluation of maintenance at 80° C.

Stable: A sample for which the number of days taken until gelling occurred is 50 days or longer.

Unstable: A sample for which the number of days taken until gelling occurred is less than 50 days.

Evaluation of dope stability

◯: A sample which is stable in both the evaluation of maintenance at 30° C. and the evaluation of maintenance at 80° C.:

X: A sample which is unstable in any one of the evaluation of maintenance at 30° C. and the evaluation of maintenance at 80° C.

<4. Single Fiber Fineness of Precursor Fiber Bundle>

The single fiber fineness means the weight per 10,000 m of one fiber. More specifically, two precursor fiber bundles were taken at a length of 1 m each, the respective masses were divided by the number of filaments (that is, the hole number of spinneret) and then multiplied by 10,000. The average value of two values thus obtained was defined as the single fiber fineness of a precursor fiber bundle.

<5. Degree of Roundness of Single Fiber Cross-Section of Precursor Fiber Bundle>

(1) Production of Sample for Measuring Degree of Roundness i) A cotton thread was half-wound at the central area in the fiber axis direction of an appropriate amount of a precursor fiber bundle, and both ends of the cotton thread were combined. This cotton thread was passed through a polyethylene fine tube having a length of about 15 mm (manufactured by Sansyo Co., Ltd.; trade name: HIBIKI Polyethylene Fine Tube No. 3). At this time, the precursor fiber bundle was fixed to an end of the tube. Regarding the amount of the precursor fiber bundle used, an amount in which when the precursor fiber bundle is introduced into the polyethylene fine tube, the fine tube is filled to an extent that the precursor fiber bundle does not move, is an appropriate amount. Specifically, the appropriate amount is an amount in which when the polyethylene fine tube is filled with the precursor fiber bundle, the cross-sectional shape of the precursor fiber is not deformed under pressure, and is an amount which does not result in the movement of the sample and a shift of the image at the time of image taking that is caused by excessively loose packing.

ii) An antistatic agent (manufactured by Mitsui & Co. Plastics Ltd.; trade name: STATICIDE) was entirely sprayed for about 2 seconds onto the precursor fiber bundle that had been fixed to an end of the tube.

iii) The cotton thread that was passed through the tube was pulled, and thus the precursor fiber bundle with the antistatic agent adhering thereto was introduced into the tube.

iv) The tube in which the precursor fiber bundle was placed was cut to a size of about 1 mm to 3 mm on a rubber plate using a razor.

(2) SEM Observation of Cross-Sectional Shape of Precursor Fiber Bundle i) A carbon double-sided tape (manufactured by Nisshin EM Co., Ltd., conductive carbon double-sided tape for SEM, width: 8 mm) was attached to a SEM sample plate, and the tube in which the precursor fiber bundle was placed (sample) as obtained in the section (1) was attached thereon using precision tweezers such that the fiber cross-section would be immediately on the carbon double-sided tape.

ii) The sample was observed using SEM (PHILIPS FEI-XL20 (trade name)), and five photographs in which the five or more fiber cross-sections appeared in each image were randomly taken.

(3) Measurement of Degree of Roundness of Single Fiber Cross-Section of Precursor Fiber Bundle The contour of the fiber cross-section was traced using an image analysis software (manufactured by Nippon Roper K.K., trade name: IMAGE-PRO PLUS), and the circumferential length L and the area S were measured. For each sample, twenty fiber cross-sections were randomly selected from five photographs, provided that three or more cross-sections were selected from one photograph, and measurement was made. Thus, average values of L and S ($L_{av1}$ and $S_{av1}$) were determined, and the degree of roundness was calculated by the following formula.

Degree of roundness=$(4\pi S_{av1})/(L_{av1})^2$

<6. Fiber Densities of Precursor Fiber Bundle and Stabilized Fiber Bundle>

The fiber densities of the precursor fiber bundle and the stabilized fiber bundle were respectively measured by a density gradient tube method based on JIS K7112.

<7. Maximum Diameter and Degree of Roundness of Single Fiber of Carbon Fiber Bundle>

(1) Preparation of Sample for Measuring Maximum Diameter of Single Fiber

A carbon fiber bundle cut to a length of 5 cm at an arbitrary position was embedded in an epoxy resin (EPOMOUNT main agent:EPOMOUNT curing agent=100:9 (mass ratio)), the carbon fiber bundle was cut to a size of 2 cm at an arbitrary position to expose a transverse cross-section. The cross-section was subjected to a mirror-surface treatment.

(2) Etching Treatment of Observed Surface

Furthermore, in order to make the contour of the fiber clearly seen, the transverse cross-section of the sample was etching-treated by the following method.

Apparatus used: JEOL Ltd., trade name: JP-170 Plasma Etching Apparatus

Treatment conditions

Atmospheric gas: $Ar/O_2$=75/25 (mass ratio)

Plasma power output: 50 W

Degree of vacuum: about 120 Pa

Treatment time: 5 min.

(3) SEM Observation of Carbon Fiber Bundle Cross-Section

A transverse cross-section of a sample obtained in the above sections (1) and (2) was observed using SEM (PHILIPS FEI-XL20 (trade name)), and five photographs in which five or more fiber cross-sections appeared in the image were randomly taken.

(4) Measurement of Maximum Diameter of Single Fiber Cross-Section of Carbon Fiber Bundle For each sample, 20 single fiber cross-sections were randomly selected from five photographs, provided that three or more single fiber cross-sections were selected from one photograph, and measurement was made. Among the line segments that connect any two points on the outer circumference of each single fiber cross-section, the longest line segment was defined as the maximum diameter of the single fiber, and the average of all the maximum diameters of the selected single fiber cross-sections was defined as the maximum diameter of the single fiber of the carbon fiber bundle.

(5) Measurement of Degree of Roundness of Single Fiber Cross-Section of Carbon Fiber Bundle The contour of the fiber cross-section was traced using an image analysis software (manufactured by Nippon Roper K.K., trade name: IMAGE-PRO PLUS), and the circumferential length L and the area S were measured. For each sample, twenty fiber cross-sections were randomly selected from five photographs, provided that three or more cross-sections were selected from one photograph, and measurement was made. Thus, average values of L and S ($L_{av2}$ and $S_{av2}$) were determined, and the degree of roundness was calculated by the following formula.

Degree of roundness=$(4\pi S_{av2})/(L_{av2})^2$

<8. Strand Strength and Strand Elastic Modulus of Carbon Fiber Bundle>

The properties (strand strength and strand elastic modulus) of the carbon fiber bundle were measured according to the method described in JIS R 7601.

Example 1

In an aluminum polymerization pot having a capacity of 80 liters and equipped with a turbine stirring blade (stirring blade: 240 mmϕ (diameter), four blades each measuring 55 mm×57 mm arranged in two rows), 76.5 liters of deionized exchange water was introduced such that the water surface would reach the overflow port of the polymerization pot. 0.01 g of ferrous sulfate ($Fe_2SO_4.7H_2O$) was added thereto, and the pH of the mixture was adjusted using sulfuric acid such that the pH of the reaction liquid would be 3.0. The temperature of the polymerization pot was maintained at 57° C.

Subsequently, 50 minutes before the polymerization initiation, 0.10 moles of ammonium persulfate, 0.35 moles of ammonium hydrogen sulfite, 0.3 ppm ($0.3 \times 10^{-4}$ moles) of ferrous sulfate ($Fe_2SO_4.7H_2O$), and $5.0 \times 10^{-2}$ moles of sulfuric acid, which were redox polymerization initiators, were respectively dissolved in deionized exchange water, the respective amounts being based on the monomer (100 moles). The conditions were set such that the solutions were respectively continuously supplied, stirring was performed at a stirring speed of 180 rpm and a stirring power of 1.2 kW/m$^3$, and the average retention time of the monomer in the polymerization pot was 70 minutes.

Subsequently, a continuous supply of monomers was initiated, such that monomers composed of, at a molar ratio, 97.7 mol % of acrylonitrile (hereinafter, abbreviated to "AN"), 0.5 mol % of 2-hydroxyethyl methacrylate (hereinafter, abbreviated to "HEMA"), and 1.8 mol % of acrylamide (hereinafter, abbreviated to "AAm") were supplied at the time of polymerization initiation at a ratio of water/monomer=3.0 (mass ratio). Thereafter, one hour after the polymerization initiation, the polymerization reaction temperature was lowered to 50° C., the temperature was maintained, and polymer slurry was continuously taken out through the overflow port of the polymerization pot.

An aqueous solution of a polymerization terminating agent prepared by dissolving $0.37 \times 10^{-2}$ mol % of sodium oxalate and $1.78 \times 10^{-2}$ mol % of sodium hydrogen carbonate in deionized exchange water, was added to the polymer slurry such that the pH of the polymerization slurry would be 5.5 to 6.0. This polymerization slurry was dehydration treated using an Oliver type continuous filter, and deionized exchange water (70 liters) in an amount of 10 times the amount of the polymer on a mass basis was added to the polymerization slurry to redisperse the slurry. The polymer slurry after redispersion was dehydration treated again using an Oliver type continuous filter, and the filter cake was molded into pellets and dried in a hot air circulation type dryer at 80° C. for 8 hours. Subsequently, the dried pellets were pulverized with a hammer mill. Thus, a polyacrylonitrile-based copolymer A was obtained. The composition of the copolymer A thus obtained was 97.7 mol % of the AN unit, 0.7 mol % of the HEMA unit, and 1.6 mol % of the AAm unit, and the specific viscosity was 0.22.

This copolymer was dissolved in dimethylacetamide (DMAc), and a spinning dope at a concentration of 21% by mass was prepared. The spinning dope thus obtained exhibited sufficient thermal stability in both the maintenance at 30° C. and in the maintenance at 80° C., due to the presence of hydroxyalkyl methacrylate and acrylamide in the copolymer. Subsequently, the spinning dope was spun by a wet spinning method, and thus a precursor fiber bundle was obtained. At that time, an aqueous DMAc solution having a concentration of DMAc of 45% by mass and a temperature of 35° C. was used as the coagulation bath. The single fiber fineness of the precursor fiber bundle thus obtained was 2.5 dtex, the number of filaments was 24,000, and the degree of roundness of the single fiber cross-section was 0.87.

One precursor fiber bundle was taken, and a stabilization treatment was initiated in heated air at 230° C., while the stabilization treatment was ended in heated air at 260° C., in a hot air circulation type stabilizing furnace. The stabilization treatment was carried out for 70 minutes at an elongation ratio of +2%. The density of the stabilized fiber bundle thus obtained was 1.35 g/cm$^3$.

Next, this stabilized fiber bundle was subjected to a low temperature heat treatment at a maximum temperature of 660° C. and an elongation ratio of 3.0% for 1.5 minutes in a nitrogen atmosphere, and was further subjected to a carbonization treatment in a high temperature heat treatment furnace at a maximum temperature of 1350° C., at an elongation ratio of −4.5% for about 1.5 minutes in a nitrogen atmosphere. Thus, a carbon fiber bundle was obtained.

The maximum diameter of the single fiber cross-section of the carbon fiber bundle thus obtained was 11.0 µm, and the degree of roundness was 0.86. Furthermore, the carbon fiber bundle exhibited high values such as a strand tensile strength of 4200 MPa, and a strand tensile modulus of 240 GPa. This is because compactness or homogeneity sufficient for exhibiting the performance of the carbon fiber is maintained as a HEMA unit is included in the precursor fiber; oxygen is sufficiently diffused into the interior of the fiber even if a stabilization treatment is carried out at a high temperature for a short time; and since the cross-sectional shape of the single fiber of the precursor fiber bundle is a broad bean shape having a degree of roundness of 0.87, and the distance from the outer circumference of the cross-section to the fiber center is shortened, a uniform stabilization treatment can be easily carried out.

Examples 2 to 16

In Examples 2 to 16, copolymers B, C, D, E, F, G and H were respectively obtained by the same method as that used in Example 1, except that the monomers used at the time of polymerization initiation and their supply ratios (molar ratios) were changed to the substances and values indicated in Table 1. The compositions and specific viscosities of the copolymers thus obtained are presented in Table 1. Meanwhile, the abbreviation HEA in Table 1 means 2-hydroxyethyl acrylate.

Spinning dopes were prepared and spun to obtain precursor fiber bundles in the same manner as in Example 1, except that the copolymers B to F were used for Examples 2 to 6, respectively; the same copolymer A as that used in Example 1 was used for all of Examples 7 to 14; and the copolymers G and H were used for Examples 15 and 16, respectively, and the number of filaments, the concentration of the coagulation bath, and the temperature of the coagulation bath were changed to the values indicated in Table 1. The dope stability of the spinning dope, the single fiber fineness of the precursor fiber bundle, the fiber density, the number of filaments, the concentration of the coagulation bath, the temperature of the coagulation bath, and the degree of roundness of the single fiber cross-section are presented in Table 1. The spinning dopes thus obtained exhibited sufficient thermal stability both in the maintenance at 30° C. and in the maintenance at 80° C., due to the presence of hydroxyalkyl methacrylate or hydroxyalkyl acrylate and acrylamide in the copolymers.

Subsequently, each of these precursor fiber bundles was subjected to a stabilization treatment in hot air at the temperature indicated in Table 1 in a hot air circulation type stabilizing furnace, at the elongation ratio and time indicated in Table 1. The densities of the various stabilized fibers thus obtained are presented in Table 1.

Furthermore, these stabilized fiber bundles were used to perform a carbonization treatment in the same manner as in Example 1, and thus carbon fiber bundles were obtained. The maximum diameter of a carbon fiber bundle thus obtained, the degree of roundness of the single fiber cross-section, the strand tensile strength, and the strand elastic modulus are presented in Table 1.

The strand tensile strengths and the strand tensile moduli of the carbon fiber bundles obtained in Example 2 to Example 16 all exhibited high values. This is because the precursor fibers have sufficient compactness or homogeneity as in the case of Example 1; the degree of roundness of the single fiber cross-section is 0.90 or less; and in the single fiber cross-section of the precursor fiber bundle, the distance from the outer circumference of the cross-section to the fiber center is shortened, so that a uniform stabilization treatment can be easily carried out.

Comparative Examples 1 to 13

In Comparative Examples 1 to 13, copolymers I, J, K, L, M, N, O, P and Q were respectively obtained by the same method as that used in Example 1, except that the monomers used in polymerization, and the supply ratios (molar ratios) of the monomers at the time of polymerization initiation were changed to the substances and values indicated in Table 2. Furthermore, the abbreviation MAA in Table 2 stands for methacrylic acid, and IBMA stands for isobutyl methacrylate. The compositions and specific viscosities of the copolymers thus obtained are presented in Table 2.

In Comparative Examples 1 to 13, spinning dopes were prepared and spun to obtain precursor fiber bundles in the same manner as in Example 1, except that the copolymers I to Q were used for Comparative Examples 1 to 13, respectively, and the number of filaments, concentration of the coagulation bath, and temperature of the coagulation bath were changed to the values indicated in Table 2. However, in Comparative Example 8, spinning properties were poor compared with other Examples and Comparative Examples, and a precursor fiber bundle could not be obtained. Furthermore, in Comparative Examples 12 and 13, the copolymers did not dissolve in DMAc, and spinning dopes could not be obtained.

The single fiber fineness of the precursor fiber bundle, fiber density, concentration of the coagulation bath, temperature of the coagulation bath, number of filaments, and degree of roundness of the single fiber cross-section are presented in Table 2.

The spinning dope obtained in Comparative Example 1 exhibited deteriorated thermal stability in the maintenance at 80° C. due to the MAA contained in the copolymer I.

The spinning dope obtained in Comparative Example 2 exhibited sufficient thermal stability in the maintenance at 80° C. due to the IBMA included in the copolymer J, but exhibited deteriorated thermal stability in the maintenance at 30° C. This is because since the molar composition of AN included in the copolymer J is too high in the absence of AAm and a hydroxyalkyl unsaturated carboxylate, solubility in DMAc as a solvent is not appropriately retained, and undissolved materials are present in large amounts.

The spinning dope obtained in Comparative Example 3 exhibited enhanced thermal stability in the maintenance at 80° C. due to the HEMA included in the copolymer K, but exhibited deteriorated thermal stability in the maintenance at 30° C.

The spinning dope obtained in Comparative Example 4 exhibited enhanced thermal stability respectively in the maintenance at 80° C. and in the maintenance at 30° C., due to the AAm included in the copolymer L.

The spinning dopes obtained in Comparative Examples 5 to 9 exhibited enhanced thermal stability respectively in the maintenance at 80° C. and in the maintenance at 30° C., due to the AAm and IBMA included in the copolymer M.

The spinning dopes obtained in Comparative Examples 10 and 11 exhibited enhanced thermal stability respectively in the maintenance at 80° C. and in the maintenance at 30° C. due to the AAm and HEMA that are included in the copolymers N and O, respectively.

Subsequently, these precursor fiber bundles (excluding Comparative Examples 8, 12 and 13) were respectively subjected to a stabilization treatment in heated air at the temperatures indicated in Table 2 in a hot air circulation type stabilizing furnace, at the elongation ratios and time indicated in Table 2. The densities of the various stabilized fibers thus obtained are presented in Table 2.

Furthermore, these stabilized fiber bundles were subjected to a carbonization treatment in the same manner as in Example 1, and thus carbon fiber bundles were obtained. The maximum diameter of a carbon fiber thus obtained, the degree of roundness of the single fiber cross-section, the strand tensile strength, and the strand elastic modulus are presented in Table 2.

The strand tensile strength of the carbon fiber bundle obtained in Comparative Example 1 was 3700 MPa, and the strand tensile modulus was 210 GPa, which both exhibited lower values compared to the Examples. This is because, since the MAA included in the copolymer I is such that unlike HEMA or the like, the carboxyl group of MAA is not hydroxyalkylated, the stabilizing reaction proceeds from a low temperature. Therefore, since oxygen permeability of the precursor fiber is low, oxygen cannot diffuse into the interior of the precursor fiber having a large value of the single fiber fineness, and a stabilization treatment cannot be carried out uniformly.

The carbon fiber bundle obtained in Comparative Example 2 exhibited lower values both for the strand tensile strength and the strand tensile modulus, as compared with the Examples. This is because since monomers having hydrophilic groups, such as the HEMA unit, are not included in the precursor fiber, compactness or homogeneity sufficient for exhibiting the performance of the carbon fiber cannot be maintained.

The carbon fiber bundle obtained in Comparative Example 3 exhibited higher values of the strand tensile strength and the strand tensile modulus, similarly to the Examples. However, as described above, since the spinning dope had lower stability, productivity of the precursor fiber bundle was lower than that of the Examples, and as a result, productivity of the carbon fiber bundle is also decreased.

The carbon fiber bundle obtained in Comparative Example 4 exhibited lower values for both the strand tensile modulus and the strand tensile strength compared with the Examples. This is because since a hydroxyalkyl unsaturated carboxylate unit does not exist in the copolymer, and unlike a hydroxyalkyl unsaturated carboxylate, acrylamide rapidly undergoes a stabilizing reaction at a temperature of 250° C. or higher, the stabilization treatment cannot be carried out uniformly, and the formation of a double cross-section structure is accelerated.

The tensile strength of the carbon fiber bundle obtained in Comparative Example 5 was 3500 MPa, and the strand elastic modulus was 220 GPa, which both exhibited lower values compared to the Examples. This is because the stabilization treatment cannot be carried out uniformly, and the formation of the double cross-section structure is accelerated due to the following points: that is, acrylamide rapidly undergoes a stabilizing reaction at a temperature of 250° C. or higher; and when an unsaturated carboxylic acid ester that does not contain a hydroxyalkyl is used, the effect provided by a hydroxyalkyl unsaturated carboxylate that the stabilizing reaction proceeds mildly at a temperature of 240° C. or higher, cannot be obtained.

The strand tensile strength of the carbon fiber bundle obtained in Comparative Example 6 was 2200 MPa, and the strand elastic modulus was 180 GPa, which both exhibited lower values compared to the Examples. This is because, the stabilization treatment cannot be carried out uniformly, and the formation of the double cross-section structure is accelerated due to the following points: that is, acrylamide rapidly undergoes a stabilizing reaction at a temperature of 250° C. or higher; when an unsaturated carboxylic acid ester that does not contain a hydroxyalkyl is used, the effect provided by a hydroxyalkyl unsaturated carboxylate that the stabilizing reaction proceeds mildly at a temperature of 240° C. or higher, cannot be obtained; and since the coagulation bath conditions for the precursor fiber bundle include a coagulation bath concentration of 65% by mass and a coagulation bath temperature of 55° C., the degree of roundness of the single fiber cross-sectional shape of the precursor fiber thus obtainable is 0.97, which is close to a perfect circle. Meanwhile, when the coagulation bath temperature is 55° C., macrovoids are generated in the fiber, and the performance of the resulting carbon fiber bundle is lowered, as compared with the case where the coagulation bath temperature is 20° C. to 50° C.

The strand tensile strength of the carbon fiber bundle obtained in Comparative Example 7 was 2400 MPa, and the strand elastic modulus was 200 GPa, which both exhibited lower values compared to the Examples. This is due to the following points: that is, acrylamide rapidly undergoes a stabilizing reaction at a temperature of 250° C. or higher; when an unsaturated carboxylic acid ester that does not contain a hydroxyalkyl is used, the effect provided by a hydroxyalkyl unsaturated carboxylate that the stabilizing reaction proceeds mildly at a temperature of 240° C. or higher, cannot be obtained; and the single fiber cross-sectional shape of the precursor fiber bundle thus obtainable has a degree of roundness of 0.85 and is a broad bean shape, but since the coagulation bath temperature is 55° C., macrovoids are generated in the fiber, and the performance of the resulting carbon fiber is lowered as compared with the case where the coagulation bath temperature is 20° C. to 50° C.

In Comparative Example 8, a calcinable precursor fiber bundle could not be obtained. This is because under the coagulation bath conditions for the precursor fiber bundle, such as a coagulation bath concentration of 65% by mass and a coagulation bath temperature of 15° C., the rate of coagulation of the spinning dope decreases in the coagulation bath as compared with the case where the coagulation bath concentration is 30% to 70% by mass and the coagulation bath temperature is 20° C. to 50° C., coagulation failure is likely to occur, the coagulation tension cannot be easily maintained in an appropriate range, and yarn breakage occurs frequently.

The strand tensile strength of the carbon fiber bundle obtained in Comparative Example 9 was 3000 MPa, and the strand elastic modulus was 200 GPa, which both exhibited lower values compared to the Examples. This is due to the following points: that is, acrylamide rapidly undergoes a stabilizing reaction at a temperature of 250° C. or higher; when an unsaturated carboxylic acid ester that does not contain a hydroxyalkyl is used, the effect provided by a hydroxyalkyl unsaturated carboxylate that the stabilizing reaction proceeds mildly at a temperature of 240° C. or higher, cannot be obtained; and the single fiber cross-sectional shape of the precursor fiber bundle thus obtainable has a degree of roundness of 0.84 and is a broad bean shape, but as compared with the case where the coagulation bath concentration of 30% to 70% by mass and a coagulation bath temperature of 20° C. to 50° C., the rate of coagulation is accelerated, and even if the coagulation bath temperature is adjusted to 15° C., macrovoids are generated in the fiber, and the performance of the resulting carbon fiber is lowered.

The strand tensile strength of the carbon fiber obtained in Comparative Example 10 was 3400 MPa, and the strand elastic modulus was 220 GPa, which both exhibited lower values compared to the Examples. This is due to the following points: that is, the AN content of the copolymer N is as low as 92.0 mol %; acrylamide rapidly undergoes a stabilizing reaction at a temperature of 250° C. or higher; and since the content of HEMA is so large as 4.0 mol %, the stabilizing reaction occurs too rapidly, and the formation of a double cross-section structure has been accelerated.

The strand tensile strength of the carbon fiber obtained in Comparative Example 11 was 3200 MPa, and the strand elastic modulus was 205 GPa, which both exhibited lower values compared to the Examples. This is due to the following points: that is, the AN content of the copolymer N is as low as 92.0 mol %; and acrylamide rapidly undergoes a stabilizing reaction at a temperature of 250° C. or higher.

In Comparative Examples 12 and 13, spinning dopes could not be obtained as described above. This is because in these Comparative Examples, since the percentage content of the (meth)acrylamide-based unit in the copolymer was smaller than 0.5 mol %, the solubility in a solvent (DMAc) of the copolymer thus obtained was decreased.

When a carbon fiber precursor fiber is produced using the copolymer of the present invention, a carbon fiber precursor fiber having a large value of the single fiber fineness and excellent productivity can be uniformly treated without causing a decrease in productivity in the stabilization treatment process. Thus, a high quality carbon fiber can be obtained.

TABLE 1

| | | Example 1 Copolymer A | Example 2 Copolymer B | Example 3 Copolymer C | Example 4 Copolymer D | Example 5 Copolymer E | Example 6 Copolymer F | Example 7 Copolymer A | Example 8 Copolymer A | Example 9 Copolymer A | Example 10 Copolymer A | Example 11 Copolymer A | Example 12 Copolymer A | Example 13 Copolymer A | Example 14 Copolymer A | Example 15 Copolymer G | Example 16 Copolymer H |
|---|---|---|---|---|---|---|---|---|---|---|---|---|---|---|---|---|---|
| Composition rate of monomer supplied | AN mol % | 97.7 | 97.9 | 98.0 | 97.4 | 97.7 | 97.7 | 97.7 | 97.7 | 97.7 | 97.7 | 97.7 | 97.7 | 97.7 | 97.7 | 97.9 | 90.4 |
| | HEMA mol % | 0.5 | 0.5 | 0.8 | 1.1 | 0.7 | — | 0.5 | 0.5 | 0.5 | 0.5 | 0.5 | 0.5 | 0.5 | 0.5 | 0.2 | 2.1 |
| | HEA mol % | — | — | — | — | — | 0.9 | — | — | — | — | — | — | — | — | — | 7.5 |
| | AAm mol % | 1.8 | 1.6 | 1.2 | 1.5 | 1.6 | 1.4 | 1.8 | 1.8 | 1.8 | 1.8 | 1.8 | 1.8 | 1.8 | 1.8 | 1.9 | 3.0 |
| Weyer/monomer | mass ratio | 3.0 | 3.0 | 3.0 | 3.0 | 3.0 | 3.0 | 3.0 | 3.0 | 3.0 | 3.0 | 3.0 | 3.0 | 3.0 | 3.0 | 3.0 | 3.0 |
| Copolymer composition ratio | AN mol % | 97.7 | 97.9 | 97.8 | 97.5 | 97.9 | 97.9 | 97.7 | 97.7 | 97.7 | 97.7 | 97.7 | 97.7 | 97.7 | 97.7 | 98.7 | 93.0 |
| | HEMA mol % | 0.7 | 0.7 | 1.0 | 1.2 | 0.7 | — | 0.7 | 0.7 | 0.7 | 0.7 | 0.7 | 0.7 | 0.7 | 0.7 | 0.3 | 3.0 |
| | HEA mol % | — | — | — | — | — | 0.9 | — | — | — | — | — | — | — | — | — | — |
| | AAm mol % | 1.6 | 1.4 | 1.2 | 1.3 | 1.4 | 1.2 | 1.6 | 1.6 | 1.6 | 1.6 | 1.6 | 1.6 | 1.6 | 1.6 | 1.0 | 4.0 |
| Molecular weight | Specific viscosity | 0.22 | 0.20 | 0.22 | 0.22 | 0.22 | 0.22 | 0.22 | 0.22 | 0.22 | 0.22 | 0.22 | 0.22 | 0.22 | 0.22 | 0.22 | 0.22 |
| Number of days for dope gelling | Maintenance at 30° C. Days | 38 | 35 | 31 | 40 | 36 | 37 | 38 | 38 | 38 | 38 | 38 | 38 | 38 | 38 | 36 | 45 |
| | Maintenance at 80° C. Days | 50 days or longer | 50 days or longer | 50 days or longer | 50 days or longer | 50 days or longer | 50 days or longer | 50 days or longer | 50 days or longer | 50 days or longer | 50 days or longer | 50 days or longer | 50 days or longer | 50 days or longer | 50 days or longer | 50 days or longer | 50 days or longer |
| Evaluation of dope stability | ○ or × | ○ | ○ | ○ | ○ | ○ | ○ | ○ | ○ | ○ | ○ | ○ | ○ | ○ | ○ | ○ | ○ |
| Precursor fiber bundle | Single fiber fineness dtex | 2.5 | 1.5 | 3.0 | 2.5 | 2.5 | 2.5 | 2.5 | 2.5 | 2.5 | 2.5 | 2.5 | 2.5 | 2.5 | 2.5 | 2.5 | 2.5 |
| | Fiber density g/cm³ | 1.18 | 1.18 | 1.18 | 1.18 | 1.18 | 1.18 | 1.18 | 1.18 | 1.18 | 1.18 | 1.18 | 1.18 | 1.18 | 1.18 | 1.18 | 1.18 |
| | Number of filaments Pieced | 24000 | 40000 | 20000 | 24000 | 24000 | 24000 | 24000 | 24000 | 24000 | 24000 | 24000 | 24000 | 24000 | 24000 | 24000 | 24000 |
| | Coagulation bath concentration mass % | 45 | 45 | 45 | 45 | 45 | 45 | 60 | 30 | 60 | 45 | 30 | 60 | 45 | 30 | 30 | 30 |
| | Coagulation bath temperture ° C. | 35 | 35 | 35 | 35 | 35 | 35 | 35 | 35 | 20 | 20 | 20 | 45 | 45 | 45 | 45 | 45 |
| | Degree of roundness | 0.87 | 0.88 | 0.88 | 0.87 | 0.89 | 0.87 | 0.88 | 0.85 | 0.85 | 0.82 | 0.80 | 0.89 | 0.88 | 0.86 | 0.84 | 0.88 |

TABLE 1-continued

| | | | Example 1 Copolymer A | Example 2 Copolymer B | Example 3 Copolymer C | Example 4 Copolymer D | Example 5 Copolymer E | Example 6 Copolymer F | Example 7 Copolymer A | Example 8 Copolymer A | Example 9 Copolymer A | Example 10 Copolymer A | Example 11 Copolymer A | Example 12 Copolymer A | Example 13 Copolymer A | Example 14 Copolymer A | Example 15 Copolymer G | Example 16 Copolymer H |
|---|---|---|---|---|---|---|---|---|---|---|---|---|---|---|---|---|---|---|
| Stabilization treatment | Treatment time | Minutes | 70 | 70 | 90 | 90 | 90 | 90 | 70 | 70 | 70 | 70 | 70 | 70 | 70 | 70 | 70 | 70 |
| | Temperature | °C. | 230–260 | 230–260 | 230–270 | 230–270 | 230–270 | 230–270 | 230–260 | 230–260 | 230–260 | 230–260 | 230–260 | 230–260 | 230–260 | 230–260 | 240–270 | 220–250 |
| | Elongation ratio | % | +2 | +2 | +2 | +2 | +2 | +2 | +2 | +2 | +2 | +2 | +2 | +2 | +2 | +2 | +2 | +2 |
| | Density of stabiraized fiber | g/cm³ | 1.35 | 1.35 | 1.41 | 1.42 | 1.41 | 1.40 | 1.35 | 1.35 | 1.35 | 1.35 | 1.35 | 1.35 | 1.35 | 1.35 | 1.35 | 1.35 |
| Carbon fiber bundle | Diameter (maximum diameter) | μm | 11.0 | 8.6 | 12.0 | 11.0 | 11.1 | 11.5 | 11.3 | 12.1 | 11.5 | 11.9 | 12.3 | 11.0 | 11.6 | 11.7 | 11.7 | 11.7 |
| | Degree of roundness | — | 0.86 | 0.87 | 0.87 | 0.86 | 0.86 | 0.86 | 0.87 | 0.84 | 0.84 | 0.81 | 0.79 | 0.88 | 0.87 | 0.85 | 0.83 | 0.87 |
| | Strand strength | MPa | 4200 | 4600 | 3800 | 3900 | 3950 | 3850 | 3950 | 4300 | 4250 | 4300 | 4350 | 3800 | 4100 | 4250 | 4200 | 4250 |
| | Strand elastic modulus | GPa | 240 | 260 | 230 | 250 | 240 | 245 | 235 | 245 | 245 | 247 | 250 | 230 | 235 | 245 | 240 | 235 |

TABLE 2

| | | Comparative Example 1 Copolymer I | Comparative Example 2 Copolymer J | Comparative Example 3 Copolymer K | Comparative Example 4 Copolymer L | Comparative Example 5 Copolymer M | Comparative Example 6 Copolymer M | Comparative Example 7 Copolymer M | Comparative Example 8 Copolymer M | Comparative Example 9 Copolymer M | Comparative Example 10 Copolymer N | Comparative Example 11 Copolymer O | Comparative Example 12 Copolymer P | Comparative Example 13 Copolymer Q |
|---|---|---|---|---|---|---|---|---|---|---|---|---|---|---|
| Composition rate of monomer supplied | AN mol % | 97.0 | 98.5 | 98.7 | 97.9 | 97.7 | 97.7 | 97.7 | 97.7 | 97.7 | 89.6 | 88.5 | 98.9 | 99.1 |
| | HEMA mol % | 2.6 | — | 1.3 | — | — | — | — | — | — | 2.9 | 2.1 | 0.5 | 0.7 |
| | AAm mol % | 0.4 | — | — | 2.1 | 1.6 | 1.6 | 1.6 | 1.6 | 1.6 | 7.5 | 9.4 | 0.6 | 0.2 |
| | MAA mol % | — | 1.5 | — | — | — | — | — | — | — | — | — | — | — |
| | IBMA mol % | — | — | — | — | 0.7 | 0.7 | 0.7 | 0.7 | 0.7 | — | — | — | — |
| | Weyer/monomer mass ratio | 3.0 | 3.0 | 3.0 | 3.0 | 3.0 | 3.0 | 3.0 | 3.0 | 3.0 | 3.0 | 3.0 | 3.0 | 3.0 |
| Copolymer composition ratio | AN mol % | 97.5 | 97.3 | 98.5 | 97.5 | 98.0 | 98.0 | 98.0 | 98.0 | 98.0 | 92.0 | 92.0 | 99.0 | 98.9 |
| | HEMA mol % | 2.0 | — | 1.5 | — | — | — | — | — | — | 4.0 | 3.0 | 0.7 | 1.0 |
| | AAm mol % | 0.5 | — | — | 2.5 | 1.2 | 1.2 | 1.2 | 1.2 | 1.2 | 4.0 | 5.0 | 0.3 | 0.1 |
| | MAA mol % | — | 2.7 | — | — | — | — | — | — | — | — | — | — | — |
| | IBMA mol % | — | — | — | — | 0.8 | 0.8 | 0.8 | 0.8 | 0.8 | — | — | — | — |
| Molecular weight | Specific viscosity | 0.24 | 0.23 | 0.21 | 0.21 | 0.22 | 0.22 | 0.22 | 0.22 | 0.22 | 0.22 | 0.22 | 0.22 | 0.22 |
| Number of days for dope gelling | Maintenance at 30° C. Days | 31 | 16 | 12 | 42 | 32 | 32 | 32 | 32 | 32 | 45 | 43 | — | — |
| | Maintenance at 80° C. Days | 34 | 50 days or longer | 50 days or longer | 50 days or longer | 50 days or longer | 50 days or longer | 50 days or longer | 50 days or longer | 50 days or longer | 50 days or longer | 50 days or longer | — | — |
| Evaluation of dope stability | ○ or x | x | x | x | ○ | ○ | ○ | ○ | ○ | ○ | ○ | ○ | — | — |
| Precursor fiber bundle | Single fiber fineness Dtex | 2.5 | 3.0 | 2.5 | 2.5 | 2.5 | 2.5 | 2.5 | 2.5 | 2.5 | 2.5 | 2.5 | — | — |
| | Fiber density g/cm³ | 1.18 | 1.18 | 1.18 | 1.18 | 1.18 | 1.18 | 1.18 | 1.18 | 1.18 | 1.18 | 1.18 | — | — |
| | Coagulation bath concentration mass % | 45 | 45 | 45 | 45 | 45 | 65 | 25 | 65 | 25 | 45 | 45 | — | — |
| | Coagulation bath temperature ° C. | 35 | 35 | 35 | 35 | 35 | 55 | 55 | 15 | 15 | 35 | 35 | — | — |
| | Number of filaments Pieced | 24000 | 20000 | 24000 | 24000 | 24000 | 24000 | 24000 | 24000 | 24000 | 24000 | 24000 | — | — |

TABLE 2-continued

| | | | Comparative Example 1 Copolymer I | Comparative Example 2 Copolymer J | Comparative Example 3 Copolymer K | Comparative Example 4 Copolymer L | Comparative Example 5 Copolymer M | Comparative Example 6 Copolymer M | Comparative Example 7 Copolymer M | Comparative Example 8 Copolymer M | Comparative Example 9 Copolymer M | Comparative Example 10 Copolymer N | Comparative Example 11 Copolymer O | Comparative Example 12 Copolymer P | Comparative Example 13 Copolymer Q |
|---|---|---|---|---|---|---|---|---|---|---|---|---|---|---|---|
| | Copolymer | — | 0.89 | 0.86 | 0.89 | 0.88 | 0.89 | 0.97 | 0.85 | — | 0.84 | 0.88 | 0.88 | — | — |
| Stabilization treatment | Degree of roundness | — | | | | | | | | | | | | | |
| | Treatment time | Minutes | 70 | 60 | 70 | 90 | 70 | 70 | 70 | | 70 | 70 | 70 | — | — |
| | Temperature | °C. | 220~255 | 260~290 | 230~260 | 230~260 | 240~270 | 240~270 | 240~270 | | 240~270 | 230~260 | 230~260 | — | — |
| | Elongation ratio | % | +2 | +2 | +2 | +2 | +2 | +2 | +2 | | +2 | +2 | +2 | — | — |
| | Density of stabilized fiber | g/cm³ | 1.35 | 1.40 | 1.35 | 1.41 | 1.35 | 1.35 | 1.35 | | 1.35 | 1.35 | 1.35 | — | — |
| Carbon fiber bundle | Diameter (maximum diameter) | μm | 11.0 | 12.0 | 11.0 | 11.1 | 11.0 | 11.0 | 11.0 | | 11.0 | 10.7 | 10.8 | — | — |
| | Degree of roundness | — | 0.87 | 0.85 | 0.88 | 0.87 | 0.88 | 0.96 | 0.84 | | 0.81 | 0.87 | 0.87 | — | — |
| | Strand strength | MPa | 3700 | 2700 | 4200 | 2700 | 3500 | 2200 | 2400 | | 3000 | 3400 | 3200 | — | — |
| | Strand elastic modulus | GPa | 210 | 190 | 240 | 220 | 220 | 180 | 200 | | 200 | 220 | 205 | — | — |

The invention claimed is:

1. A carbon fiber bundle having a maximum diameter of a single fiber of from 8 µm to 20 µm, said carbon fiber bundle obtained by calcining a precursor fiber bundle comprising a polyacrylonitrile-based precursor fiber, provided that a maximum diameter of a single fiber means the maximum value among distances between any two points on an outer circumference of a cross-section that is perpendicular to the fiber axis of the single fiber when the cross-section is observed by scanning electron microscopy (SEM),
wherein the polyacrylonitrile-based precursor fiber comprises a polyacrylonitrile-based copolymer which comprises:
an acrylonitrile unit in an amount of from 93.0 mol % to 99.4 mol %;
a (meth)acrylamide-based unit in an amount of from 0.5 mol % to 4.0 mol %; and
a hydroxyalkyl unsaturated carboxylate unit in an amount of from 0.1 mol % to 3.0 mol %,
wherein the (meth)acrylamide-based unit is one or both of a (meth)acrylamide unit and a (meth)acrylamide derivative unit having a molecular weight of 105 or less,
wherein a single fiber fineness of the polyacrylonitrile-based precursor fiber is from 1.5 dtex to 3.0 dtex, and
wherein the carbon fiber bundle has a strand tensile strength of 3800 MPa or more and a strand tensile modulus of 230 GPa or more.

2. The carbon fiber bundle of claim 1, wherein the polyacrylonitrile-based copolymer comprises:
the acrylonitrile unit in an amount of from 93.0 mol % to 98.7 mol %;
the (meth)acrylamide-based unit in an amount of from 1.0 mol % to 4.0 mol %; and
the hydroxyalkyl unsaturated carboxylate unit in an amount of from 0.3 mol % to 3.0 mol %.

3. The carbon fiber bundle of claim 2, wherein the polyacrylonitrile-based copolymer comprises:
the acrylonitrile unit in an amount of from 95.0 mol % to 98.7 mol %;
the (meth)acrylamide-based unit in an amount of from 1.0 mol % to 2.0 mol %; and
the hydroxyalkyl unsaturated carboxylate unit in an amount of from 0.5 mol % to 1.5 mol %.

4. The carbon fiber bundle of claim 2, wherein the hydroxyalkyl unsaturated carboxylate unit is any one or both of a hydroxyalkyl methacrylate unit and a hydroxyalkyl acrylate unit.

5. The carbon fiber bundle of claim 3, wherein the hydroxyalkyl unsaturated carboxylate unit is any one or both of a hydroxyalkyl methacrylate unit and a hydroxyalkyl acrylate unit.

6. The carbon fiber bundle of claim 1, wherein the hydroxyalkyl unsaturated carboxylate unit is any one or both of a hydroxyalkyl methacrylate unit and a hydroxyalkyl acrylate unit.

7. A carbon fiber bundle having a maximum diameter of a single fiber of from 8 µm to 20 µm, said carbon fiber bundle obtained by calcining a precursor fiber bundle comprising a polyacrylonitrile-based precursor fiber, provided that a maximum diameter of a single fiber means the maximum value among distances between any two points on an outer circumference of a cross-section that is perpendicular to the fiber axis of the single fiber when the cross-section is observed by scanning electron microscopy (SEM),
wherein the polyacrylonitrile-based precursor fiber comprises a polyacrylonitrile-based copolymer which comprises:
an acrylonitrile unit in an amount of from 95.0 mol % to 98.7 mol %;
a (meth)acrylamide-based unit in an amount of from 1.0 mol % to 2.0 mol %; and
a hydroxyalkyl unsaturated carboxylate unit in an amount of from 0.5 mol % to 1.5 mol %,
wherein the (meth)acrylamide-based unit is one or both of a (meth)acrylamide unit and a (meth)acrylamide derivative unit having a molecular weight of 105 or less,
wherein the hydroxyalkyl unsaturated carboxylate unit is any one or both of a hydroxyalkyl methacrylate unit and a hydroxyalkyl acrylate unit, and
wherein the carbon fiber bundle has a strand tensile strength of 3800 MPa or more and a strand tensile modulus of 230 GPa or more.

8. A method for producing the carbon fiber bundle of claim 1, the method comprising:
heating the precursor fiber bundle comprising the polyacrylonitrile-based precursor fiber, at a temperature of from 220° C. to 300° C. for a time of 90 minutes or less in an oxidizing atmosphere, and thereby obtaining a stabilized fiber bundle having a fiber density of from 1.35 g/cm$^3$ to 1.43 g/cm$^3$; and
heating the stabilized fiber bundle at a temperature of from 800° C. to 2000° C. in an inert gas, and thereby obtaining the carbon fiber bundle.

9. A method for producing the carbon fiber bundle of claim 7, the method comprising:
heating the precursor fiber bundle comprising the polyacrylonitrile-based precursor fiber, at a temperature of from 220° C. to 300° C. for a time of 90 minutes or less in an oxidizing atmosphere, and thereby obtaining a stabilized fiber bundle having a fiber density of from 1.35 g/cm$^3$ to 1.43 g/cm$^3$; and
heating the stabilized fiber bundle at a temperature of from 800° C. to 2000° C. in an inert gas, and thereby obtaining the carbon fiber bundle.

* * * * *